United States Patent
Rowlands et al.

(10) Patent No.: US 8,590,001 B2
(45) Date of Patent: Nov. 19, 2013

(54) NETWORK STORAGE SYSTEM WITH DATA PREFETCH AND METHOD OF OPERATION THEREOF

(75) Inventors: Mohan B. Rowlands, Union City, CA (US); Venkatanarasimhan Ramakrishnan, Fremont, CA (US)

(73) Assignee: Promise Technology, Inc., Milpitas, CA (US)

( * ) Notice: Subject to any disclaimer, the term of this patent is extended or adjusted under 35 U.S.C. 154(b) by 572 days.

(21) Appl. No.: 12/860,856

(22) Filed: Aug. 20, 2010

(65) Prior Publication Data

US 2012/0047548 A1 Feb. 23, 2012

(51) Int. Cl.
*H04N 7/16* (2011.01)

(52) U.S. Cl.
USPC ............. 725/142; 725/74; 725/32; 725/82; 725/105; 710/74

(58) Field of Classification Search
USPC ................ 725/82, 74, 105, 32, 142; 710/74
See application file for complete search history.

(56) References Cited

U.S. PATENT DOCUMENTS

| | | | |
|---|---|---|---|
| 5,659,799 A * | 8/1997 | Wu et al. | 710/57 |
| 5,758,057 A * | 5/1998 | Baba et al. | 714/6.32 |
| 7,069,375 B2 | 6/2006 | Avida et al. | |
| 7,254,674 B2 * | 8/2007 | Yamamoto et al. | 711/114 |
| 7,324,555 B1 | 1/2008 | Chen et al. | |
| 7,526,564 B2 | 4/2009 | Guo et al. | |
| 7,707,382 B2 * | 4/2010 | Gill et al. | 711/173 |
| 7,752,362 B2 * | 7/2010 | Nishimoto et al. | 710/74 |
| 2004/0043755 A1 * | 3/2004 | Shimooka et al. | 455/410 |

* cited by examiner

*Primary Examiner* — Pankaj Kumar
*Assistant Examiner* — Sahar Baig
(74) *Attorney, Agent, or Firm* — Ishimaru & Associates LLP (57) ABSTRACT

A method of operation of a network storage system includes: receiving a host command for displaying a video stream; performing a forced read ahead of the video stream beyond the host command including: identifying a high definition video stream, dynamically setting a block count and a loop count for the forced read ahead, and transferring data from hard disk drives to a cache for anticipating a host next command; and transferring cached data from the cache for responding to the host next command for displaying the video stream.

20 Claims, 7 Drawing Sheets

NETWORK STORAGE SYSTEM WITH DATA PREFETCH AND METHOD OF OPERATION THEREOF

TECHNICAL FIELD

The present invention relates generally to network storage system, and more particularly to a system for storing, viewing, and editing video data.

BACKGROUND ART

Caching is a fundamental technique in hiding delays in writing data to and reading data from storage, such as hard disk drive storage, logical drive, or a network storage system. These delays can be referred to as input/output latency. Because caching is effective in hiding I/O latency, it is widely used in storage controllers, databases, file systems, and operating systems.

A cache thus may be defined as a high speed memory or storage device that is used to reduce the effective time required to read data from or write data to a lower speed memory or device. A modern storage controller cache typically contains volatile memory used as a read cache and a non-volatile memory used as a write cache. The effectiveness of a read cache depends upon its "hit" ratio, that is, the fraction of requests that are served from the cache without necessitating a disk trip (which represents a "miss" in finding data in the cache). The present invention is focused on improving the performance of a read cache, i.e., increasing the hit ratio or equivalently minimizing the miss ratio.

Typically, cache is managed in uniformly sized units called pages. So-called demand paging requires a page to be copied into cache from the slower memory (e.g., a disk) only in the event of a cache miss of the page, i.e., only if the page was required by the host and it could not be found in cache, necessitating a relatively slower disk access. In demand paging, cache management is relatively simple, and seeks to intelligently select a page from cache for replacement when the cache is full and a new page is to be stored in cache owing to a "miss". One well-known policy simply replaces the page whose next access is farthest in the future with the new page. Another policy (least recently used, or LRU) replaces the least recently used page with the new page.

As recognized herein, in addition to demand paging, further improvement can be made in hiding I/O latency by speculatively prefetching pages. Relatively complex programs have been introduced which attempt to predict when a page will be needed, but commercial systems have rarely used very sophisticated prediction schemes, because sophisticated prediction schemes require an extensive history to be kept of page accesses. This is cumbersome and expensive. Furthermore, to be effective a prefetch must complete before the predicted request, requiring sufficient prior notice that may not be feasible to attain. Also, long-term predictive accuracy may be low to begin with and can become worse with interleaving of a large number of different workloads. Finally, for a disk subsystem operating near its peak capacity, average response time increases drastically with the increasing number of disk fetches, and, hence, low accuracy predictive prefetching which results in an increased number of disk fetches can in fact worsen the performance.

Accordingly, the present invention understands that a simpler approach to speculative prefetching can be employed that uses the principle of sequential operations, which is a characteristic of demanded data (data to be read) in which consecutively numbered pages in ascending order without gaps are often required. Sequential file access arises in many contexts, including video-on-demand, database scans, copy, backup, and recovery. In contrast to sophisticated forecasting methods, as understood herein detecting sequentiality is easy, requiring very little history information, and can attain nearly 100% predictive accuracy.

However, while seemingly simple, a good sequential prefetching program and associated cache replacement policy, as critically recognized herein, is surprisingly difficult to achieve. To understand why, it must first be understood that in sequential prefetching, synchronous prefetching (bringing into cache sequential pages to a missed page) may be used initially, and after this bootstrapping stage, asynchronous prefetching (bringing into cache pages that are sequential to a demanded "trigger" page that was "hit", i.e., found in cache) is used. Prefetching and caching thus are intertwined, and one policy for cache management when prefetch is used is the above-mentioned LRU in which two lists, one listing sequential pages and one listing random access pages, are maintained according to recency of access. In the context of sequential prefetching, when tracks are prefetched or accessed, they are placed at the most recently used (MRU) end of the sequential list, while for cache replacement, tracks are evicted from the LRU end of the list.

In order to support Audio Video Ingest and Playback (for AV Broadcast/Editing purposes), the storage system must support very low latency reads and writes at different request sizes with stringent command completion time limits. Since AV files are unstructured and are stored in a file system, sequential AV data on the screen may not be stored sequentially on the media and may be scattered in the same neighborhood on the media. Location of such file fragments is quasi-deterministic and predicting the address to which the next I/O would come is a daunting task.

Thus, a need still remains for a network storage system with data prefetch. In view of the increasing demand for video on demand and the popularity of high definition video, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a network storage system including: receiving a host command for displaying a video stream; performing a forced read ahead of the video stream beyond the host command including: identifying a high definition video stream, dynamically setting a block count and a loop count for the forced read ahead, and transferring data from hard disk drives to a cache for anticipating a host next command; and transferring cached data from the cache for responding to the host next command for displaying the video stream.

The present invention provides a network storage system including: a host interface controller for receiving a host command; a disk interface controller for performing a forced read ahead beyond the host command includes: hard disk drives with a high definition video stream stored thereon, and a data and control bus between a cache and the disk interface controller for dynamically setting a block count and a loop count of the forced read ahead; and cached data transferred from the cache for responding to the host next command for displaying the high definition video stream.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals.

For expository purposes, the term "horizontal" as used herein is defined as a plane parallel to the plane or surface of the Earth, regardless of its orientation. The term "vertical" refers to a direction perpendicular to the horizontal as just defined. Terms, such as "above", "below", "bottom", "top", "side" (as in "sidewall"), "higher", "lower", "upper", "over", and "under", are defined with respect to the horizontal plane, as shown in the figures. The term "on" means that there is direct contact between elements.

The term "processing" as used herein includes calculation of initial and terminal logical block addresses, allocating space in cache memory, verifying communication between a central processing unit and various interface functions, error correction, error reporting, maintenance prediction, and/or system integrity operations for restoring functional capacity after a system alert or failure.

Figure 1:
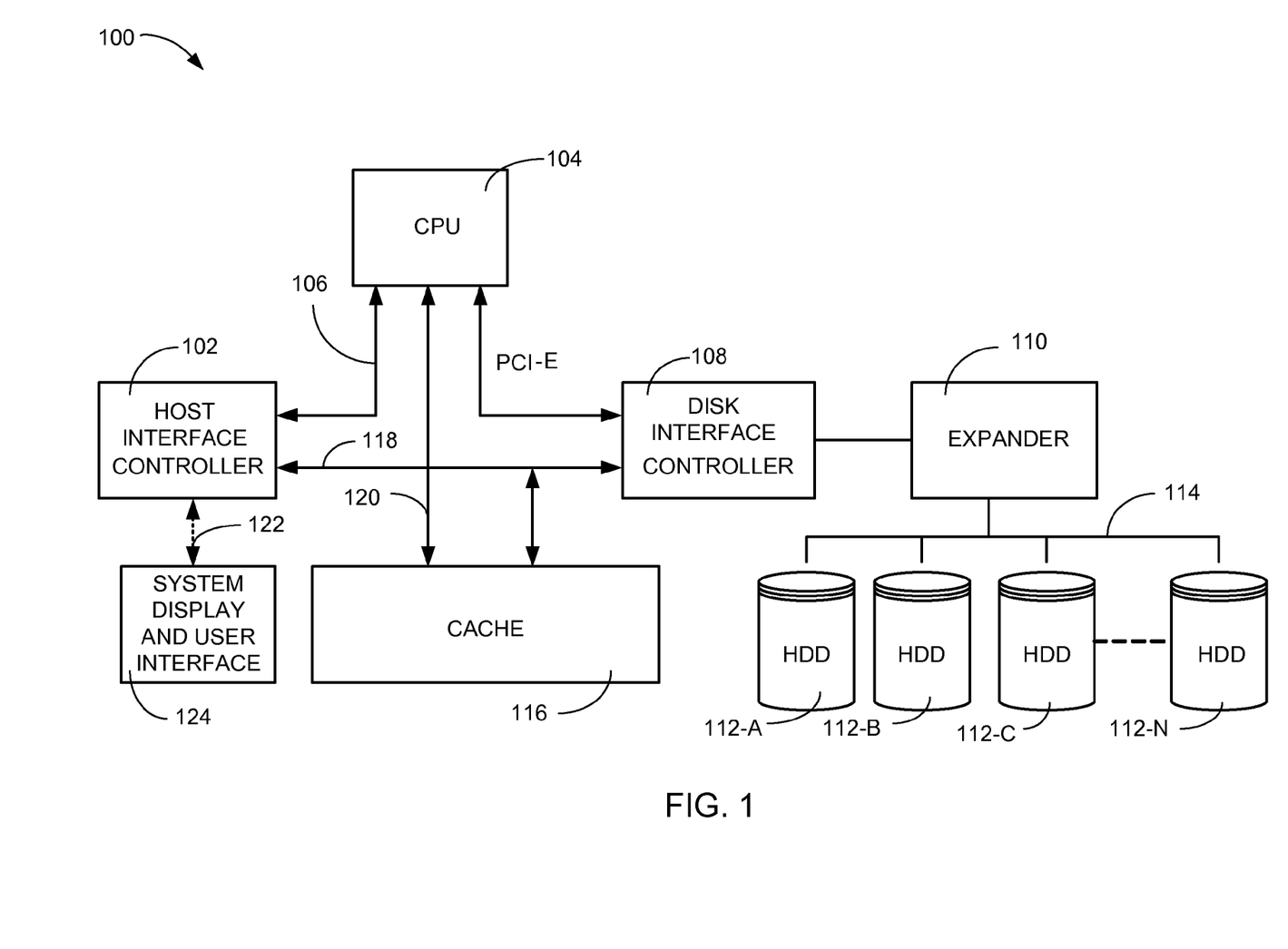
FIG. 1 is a functional block diagram of a network storage subsystem with data prefetch in an embodiment of the present invention.

Referring now to FIG. 1, therein is shown a functional block diagram of a network storage system 100 with data prefetch in an embodiment of the present invention. The functional block diagram of the network storage system 100 depicts a host interface controller 102 coupled to a central processing unit (CPU) 104 through a peripheral component interconnect bus 106, such as a peripheral component interconnect express (PCI-E).

The host interface controller 102 may include status registers, sequential logic state machines, electrical interface converters, data registers, error detection/correction logic and a network interface. The detail of the host interface controller is not shown in order to prevent obscuring the present invention.

The CPU 104 may execute machine level code or firmware required to implement the present invention. It is understood that the complexity of the CPU 104 is known to those skilled in the art and is not shown to prevent obscuring the present invention.

The CPU 104 may also be coupled to a disk interface controller 108. The disk interface controller 108 may provide the logical and electrical interface for communicating with an expander module 110 or hard disk drives 112. The expander module 110 may facilitate the connection of an increased number of the hard disk drives 112 to the disk interface controller 108.

A number of the hard disk drives 112-A through 112-N are shown for simplicity, but it is understood that a different number of the hard disk drives may be coupled to the expander module 110 through a disk interface bus 114, such as a Small Computer System Interface (SCSI), serial attached SCSI (SAS), fiber channel (FC), Serial Advanced Technology Attachment (SATA), or the like. The CPU 104 may recognize the hard disk drives 112 as single units or they may be linked together to form logical disk drives in a random array of independent disks (RAID).

While the present invention utilizes the functionality of the RAID, the attributes and operation of the RAID is not discussed since it is known to those skilled in the art. The operation and support of the RAID is managed by the CPU 104 through the normal operation of the network storage system 100. It is only the special operational changes that are the focus of this invention that are discussed and explained.

The disk interface controller may be coupled to a cache 116, such as a memory structure utilized as a holding and organizing structure for data moving between the host interface controller 102 and the hard disk drives 112. The cache 116 may be coupled to the host interface controller 102 and the disk interface controller 108 by a data and control bus 118 and to the CPU 104 by a memory interface bus 120.

A network attachment 122 may include servers, communication controllers, transmitters, receivers, switches, routers, and interface media such as wires, optical fiber, radio waves, and the like. The network attachment is not discussed in detail because it is known to those skilled in the art and may obscure the present invention.

The network attachment 122 is the connection path between a system display and user interface 124 and the host interface controller 102. While only one of the system display and user interface 124 is shown it is understood that any number of the system display and user interface 124 may be coupled through the network attachment 122.

The present invention relates to a system that allows more of the system display and user interface 124 to be supported than is possible in prior art systems. The system display and user interface 124 may represent a commercial user viewing a video-on-demand. The video may be in the classic video format or it may be a high definition video that requires additional bandwidth due to the increased amount of information required in each frame.

The host interface controller 102 transfers the data from the cache 116 for displaying a video on the system display and user interface 124. It is understood that while only a single unit of the system display and user interface 124 is shown any number of the system display and user interface 124 may be supported by the network storage system 100.

Figure 2:
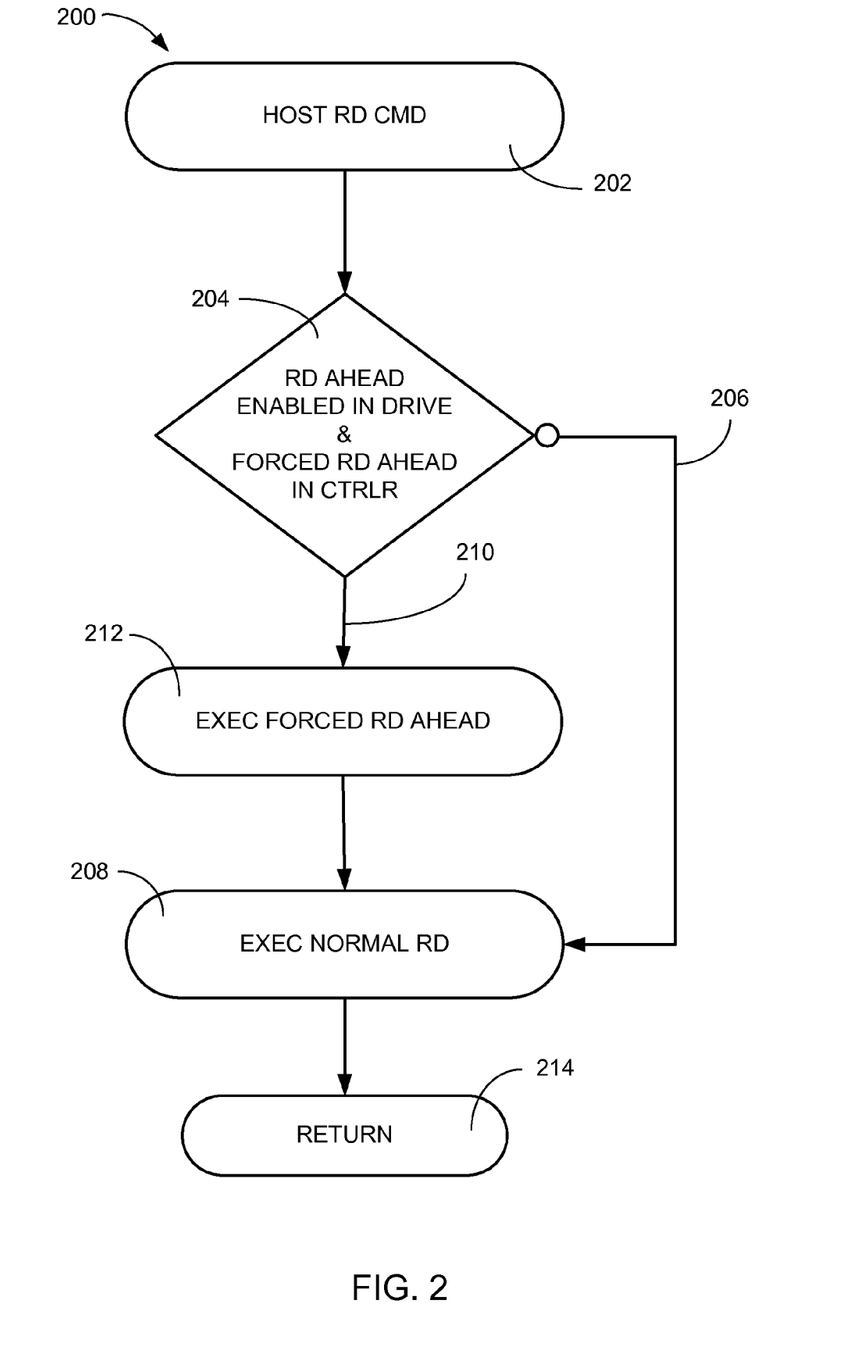
FIG. 2 is a functional flow diagram of Host read command of the present invention.

Referring now to FIG. 2, therein is shown a functional flow diagram of host read command 200 of the present invention. The functional flow diagram of the Host read command 200 depicts a host read command entry 202. The prior art read command would be subject to system latency including cache examination, disk read commands, disk availability and access time, data collection in the cache, and host bus latency to transfer the data.

The present invention mitigates a major portion of the latency by prefetching additional data for the command. Prior art prefetching programs can overrun the cache causing an artificial limit to the number of concurrent commands that the system can support. While the commands that can be executed do have reduced latency, the number of commands that can be managed by the prior art systems is limited. With increasing demand stimulated by high definition video, the only option given system administrators has been to add additional storage systems to handle the additional command bandwidth requirement.

The present invention provides a "decision block" 204 for detecting the state of read ahead attribute as configured in a logical volume (not shown) and stored as condition bits within the hard disk drives 112, of FIG. 1, and a firmware controlled bit to allow a forced read ahead command in the network storage system 100, of FIG. 1. If either of these condition bits is not activated, the flow would take a "negative bit flow" 206 to an "execute normal read block" 208. If both of the condition bits are activated the flow would take a "positive bit flow" 210 to an "execute forced read ahead block" 212 then progress to the "execute normal read block" 208. The functional flow diagram of host read command 200 completes with a "program return" 214.

Figure 3:
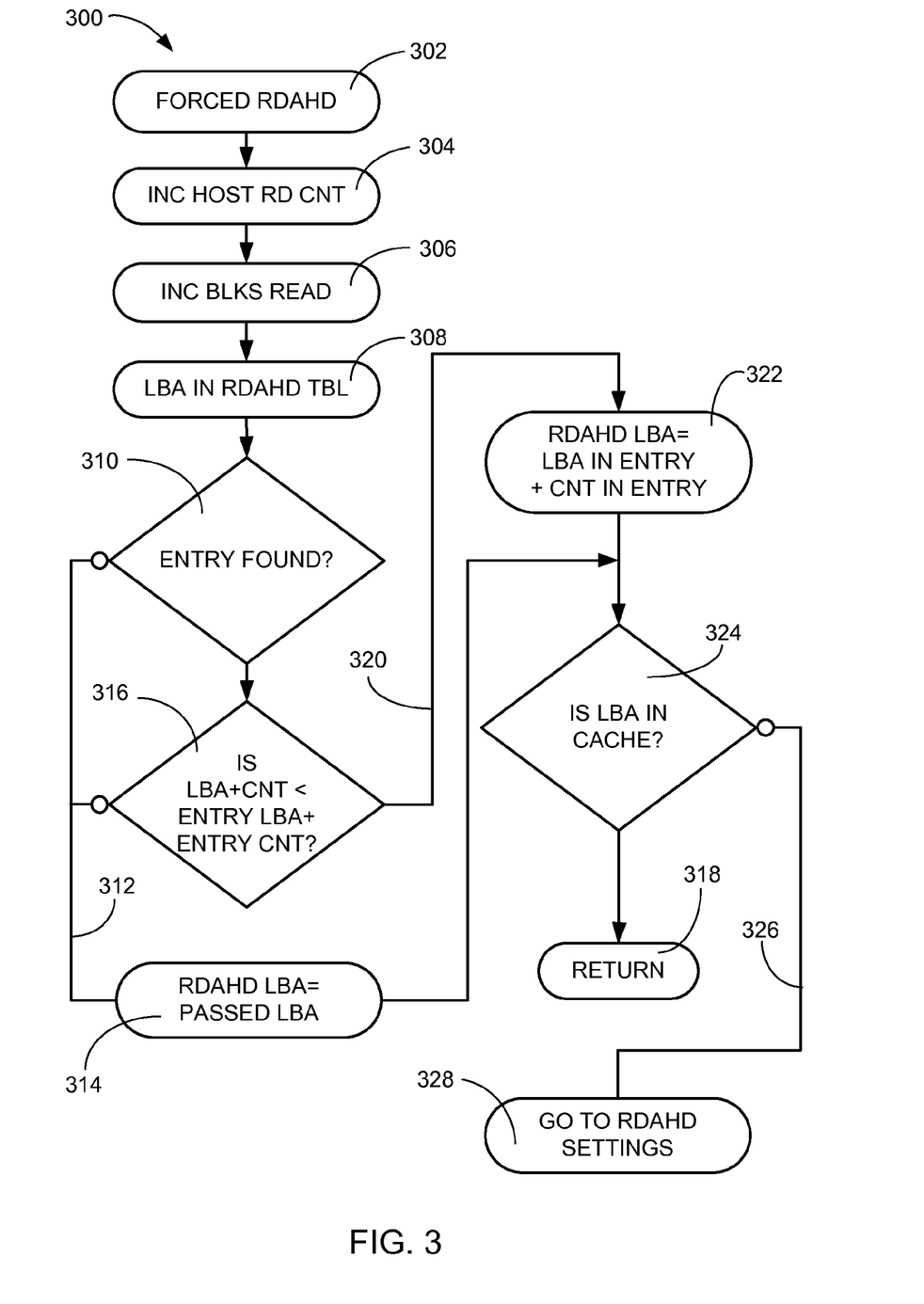
FIG. 3 is a functional flow diagram of a forced read ahead command initialization in an embodiment of the present invention.

Referring now to FIG. 3, therein is shown a functional flow diagram of a forced read ahead command initialization 300 in an embodiment of the present invention. The functional flow diagram of the forced read ahead command initialization 300 depicts a "forced read ahead entry" 302.

The "forced read ahead entry" 302 progresses to an "increment host read count" 304. The forced read ahead function provides a dynamic adjustment to the number of blocks read by the host. The adjustment may be guided by the type of data actively read by the host being standard video or high definition video. The "increment host read count" 304 increments the host read count. The flow progresses to an "increment blocks read" 306 to increment the total number of blocks read by the host by the forced read ahead count.

The read ahead table in memory is scanned by the CPU 104, of FIG. 1, to see if the target blocks are already in the cache 116, of FIG. 1, in a "logical block address (LBA) in read ahead table" 308. An "entry found" 310 decision block determines if the LBAs are in the cache 116. If the LBAs are found in the entry table, it is assumed the read has already been done and any subsequent blocks are read to complete the entry.

If the desired LBAs are not found in the cache 116, the flow takes a "not found" 312 path to a "read ahead LBA equal to Passed LBA" 314. In this state, the read ahead LBA is passed to the read ahead function. The read ahead LBA will be equal to the current read LBA plus the number of logical blocks requested to read by the host. When the desired LBAs are not in the read ahead table, the Passed LBA is set equal to the read ahead LBA. This adds the number of blocks associated with the forced read ahead to the read command LBAs and saves the result as the passed LBA, which indicates the completion of the read command. The flow then proceeds to a "is LBA in cache" 324 to determine if all of the requested LBAs are in the cache 116. If the desired LBAs are in the cache 116, the flow mover to the "return" 318 to allow the CPU 104 to initialize the host interface controller 102 to transfer the data.

If the desired LBAs are found in the read ahead table, a check is performed in a "command extent check" 316. The "command extent check" 316 compares the passed LBA plus the read ahead count to the LBA range that was read earlier, which may be found in the read ahead table. If the passed LBA plus read ahead count is not less than the current read ahead LBA, the read ahead table entry is updated with the new value and the flow takes the "not found" 312 path to the "read ahead LBA equal to Passed LBA" 314.

If the desired LBAs are found in the read ahead table and the count is less than the command complete, the flow takes a "read plus" 320 flow to a "read ahead LBA equal LBA in table plus read ahead count" 322. The "read ahead LBA equal LBA in table plus read ahead count" 322 adds the read ahead count of blocks to the number of blocks already found in the read ahead table to convey the read to the disk interface controller 108, of FIG. 1.

A check is performed by the "is LBA in cache" 324 to determine if all of the requested LBAs are in the cache 116. If the desired LBAs are in the cache 116, the flow mover to the "return" 318 to allow the CPU 104 to initialized the host interface controller 102 to transfer the data.

If the desired LBAs are not in the cache the program flow takes a "not found in cache" 326 to a "go to read ahead settings" 328 for further processing. It is understood that the transfer from the cache 116 is very desirable because of the reduction in latency. In order to judiciously use the space in the cache 116, the force read ahead command adds an appropriate number of blocks to keep the latency down and provide additional space in the cache for a higher number of commands.

It will be understood by those having ordinary skill in the art that the read ahead table will contain the LBAs that have been requested for a read command. This should not be confused with a cache table which will contain the LBAs that have already been read into memory. Due to the latency of the disk drives 112 some LBAs may be represented in the read ahead table that are not yet in the cache. It has been discovered that the overall command latency for read commands from the host may be reduced by the forced read ahead hardware and software.

Figure 4:
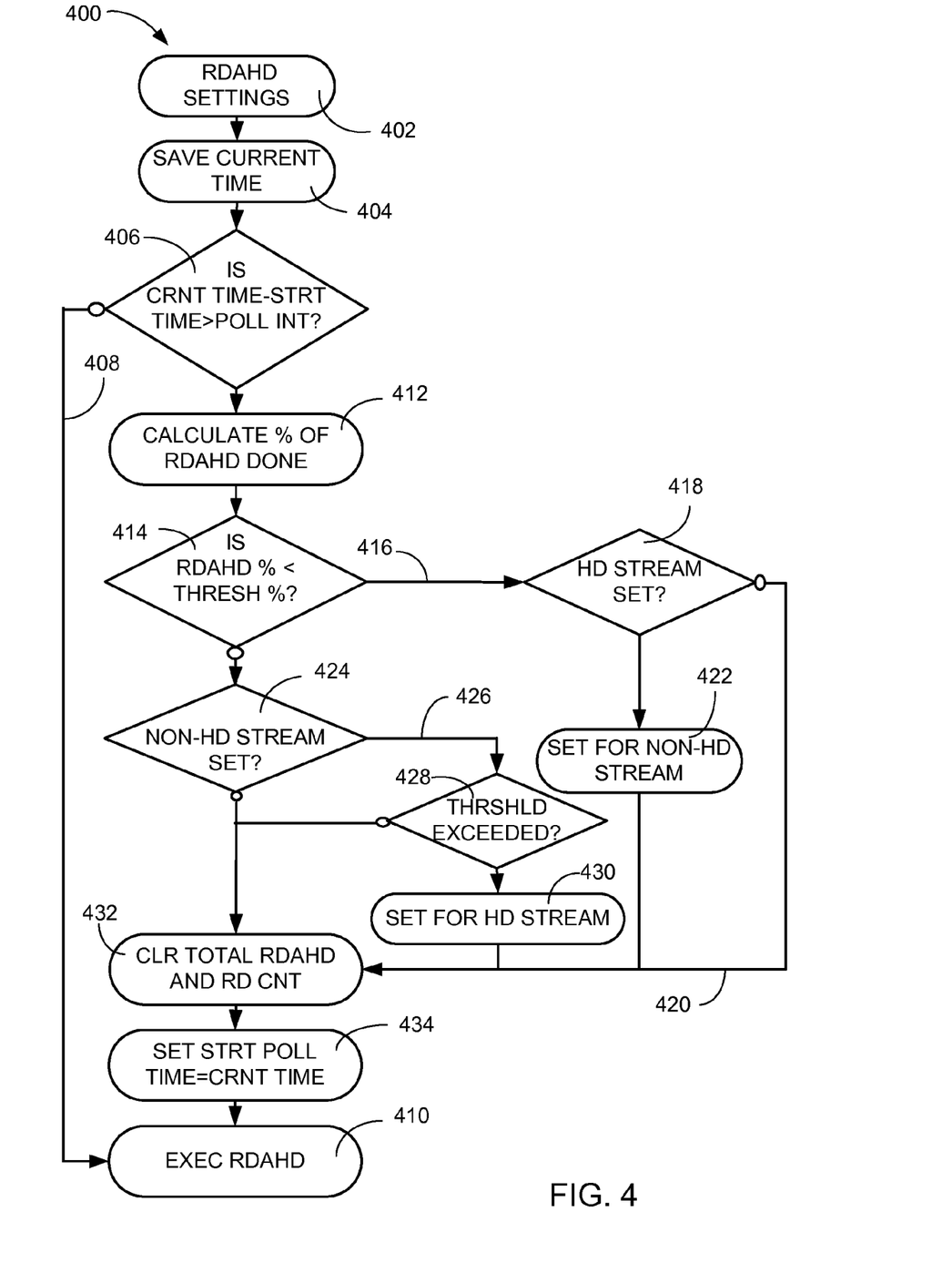
FIG. 4 is a functional flow diagram of a forced read ahead dynamic check for high definition (HD) or non-HD video streams in an embodiment of the present invention.

Referring now to FIG. 4, therein is shown a functional flow diagram of a forced read ahead dynamic check 400 for high definition (HD) or non-HD video streams in an embodiment of the present invention. The functional flow diagram of the forced read ahead dynamic check 400 depicts a read ahead settings entry 402 and the flow progresses to a save current time 404.

The save current time 404 may record a reading from a real time clock managed by the CPU 104, of FIG. 1. A polling sequence is used to monitor the transfers and the polling interval is verified by a polling interval check 406. The polling interval check 406 subtracts the start time from the current time then compares against established polling interval. If the current time is not beyond the poll interval, the flow takes a non-scheduled path 408 and moves to an execute read ahead 410 block to complete the command as scheduled.

If the current is greater than the poll interval, the flow progresses to a calculate percent of read ahead done 412. The calculate percent of read ahead done 412 divides the total number of Host reads by the number of read ahead reads.

The flow progresses to a read ahead percentage less than threshold 414. If the read ahead percentage is determined to be less than a threshold percent, by comparing the read ahead count to the read command count having the range of 20 to 50%, a less aggressive prefetch scheme can be used for non-high definition video streams. If the read ahead percentage is determined to be equal to or more than the threshold a more aggressive prefetch scheme can be used for high definition video streams in order to maintain the data in the cache 116 for additional host read commands. It has been discovered that the preferred threshold percent is 31%, but it is understood that this may be configuration sensitive.

If it is determined that the read ahead percentage is less than the threshold percent, the flow progresses through an idle prefetch path 416 to a check for high definition stream 418. If the high definition stream condition bit is set, the flow moves to a set for non-HD stream 422. The set for non-high definition stream 422 resets the high definition stream condition bit and causes the number of reads ahead to do to be set to 64 and the number of blocks per read ahead is set to 128. The resulting configuration translates to 4 MB transferred by the reads ahead.

It has been discovered that forced read ahead of the present invention can transfer a large amount of data from the hard disk drives 112, of FIG. 1, without adding undue latency to concurrent commands. By performing multiple smaller transfers from the hard disk drives 112, such as 128 blocks performed in 64 iterations, other commands may have access to the hard disk drives 112 for command execution. The resulting 4 MB transfer, if not divided, would otherwise dominate the hard disk drives and reduce the efficiency of their use. The present invention provides reduced latency without giving up the ability to process a high volume of commands.

If the high definition stream condition bit is not set, the flow moves through a maintain current stream 420 and moves to a clear total read ahead count 432. In this path the read ahead configuration remains the same and the total data transferred by read ahead remains at 4 MB.

If the read ahead percentage is not less than the threshold percent, the flow progresses to a check for non-HD stream 424. If the non-high definition condition bit is not set, the flow moves to a clear total read ahead count 432. In this path the read ahead configuration remains the same and the total data transferred by read ahead remains at 9 MB, which is for the high definition stream.

If the non-HD stream condition bit is set the flow moves through a check other parameters 426 to a check command thresholds 428. The check command thresholds 428 will test for the total host read commands to be greater than 3456 and the total reads ahead done is greater than 288. If the condition is not met, the flow keeps the settings of non-HD stream and moves to the clear total read ahead count 432. If this condition is met and the threshold is exceeded, the flow moves to the set for HD stream 430. In the set for HD stream 430, the non-high definition condition bit is reset and the high definition condition bit is set meaning that the number of reads ahead to do is set to 36 and the number of blocks per read ahead is set for 512. The resulting configuration translates to 9 MB transferred by the reads ahead.

It has been discovered that forced read ahead of the present invention can transfer a large amount of data from the hard disk drives 112 without adding undue latency to concurrent commands. By performing multiple smaller transfers from the hard disk drives 112, such as 512 blocks performed in 36 iterations, other commands may have access to the hard disk drives 112 for command execution. The resulting 9 MB transfer, if not divided, would otherwise dominate the hard disk drives and reduce the efficiency of their use. The present invention provides reduced latency without giving up the ability to process a high volume of commands.

The flow then progresses from the set to HD stream 430 through the maintain current stream 420 to the clear total read ahead count 432. In this path neither the non-high definition stream condition bit nor the high definition bit is changed.

The flow moves from the clear total read ahead count 432 to a set start poll time=current time 434. The poll time interval is initialized by this step. The preferred poll interval is two seconds and by setting the start poll time to the current time a poll interval interrupt is enabled by the CPU 104, of FIG. 1.

The flow then moves to the execute read ahead 410 block to complete the command as scheduled. It is understood that the conditional checks and process steps are an example only and the present invention includes a dynamic adjustment of the forced read ahead based on the number of host read commands issued, the number of host blocks read, the number of reads ahead performed by the firmware and a lengthy poll interval of substantially two seconds.

It has been discovered that a program that would reduce the latency of reads by aggressively prefetching the data based on two internal parameters. One is the prefetch size and the other is number of prefetches. The program of the present invention enables the network storage system 100 to read relevant data from the hard disk drives 112 by effectively dividing the prefetch reads in to smaller sizes and doing many prefetch reads instead of one large read prefetch for every host read command. This results in better timesharing of the disk interface bus 114 that is used to access the hard disk drives 112 and the cache 116 is able to capture more relevant data that is stored in different areas of the hard disk drives 112.

It has been unexpectedly discovered that in order to support a greater number of streams and dynamically support High Resolution and Low Resolution streams, it is important to dynamically change the number of prefetches and the size of prefetches relative to the type of video stream being transferred. As the number of video streams increases, the number of commands received from the host increases as well. By monitoring the number of pending commands that arrive from the hosts, checking the prefetch pattern that is currently in process and changing the number of prefetches and size of prefetches can be dynamically adjusted based on the program of the present invention. This program is able to support playback and/or capture of multiple High Definition Audio-Video streams at various resolutions with more streams and less latency than prior art solutions.

Figure 5:
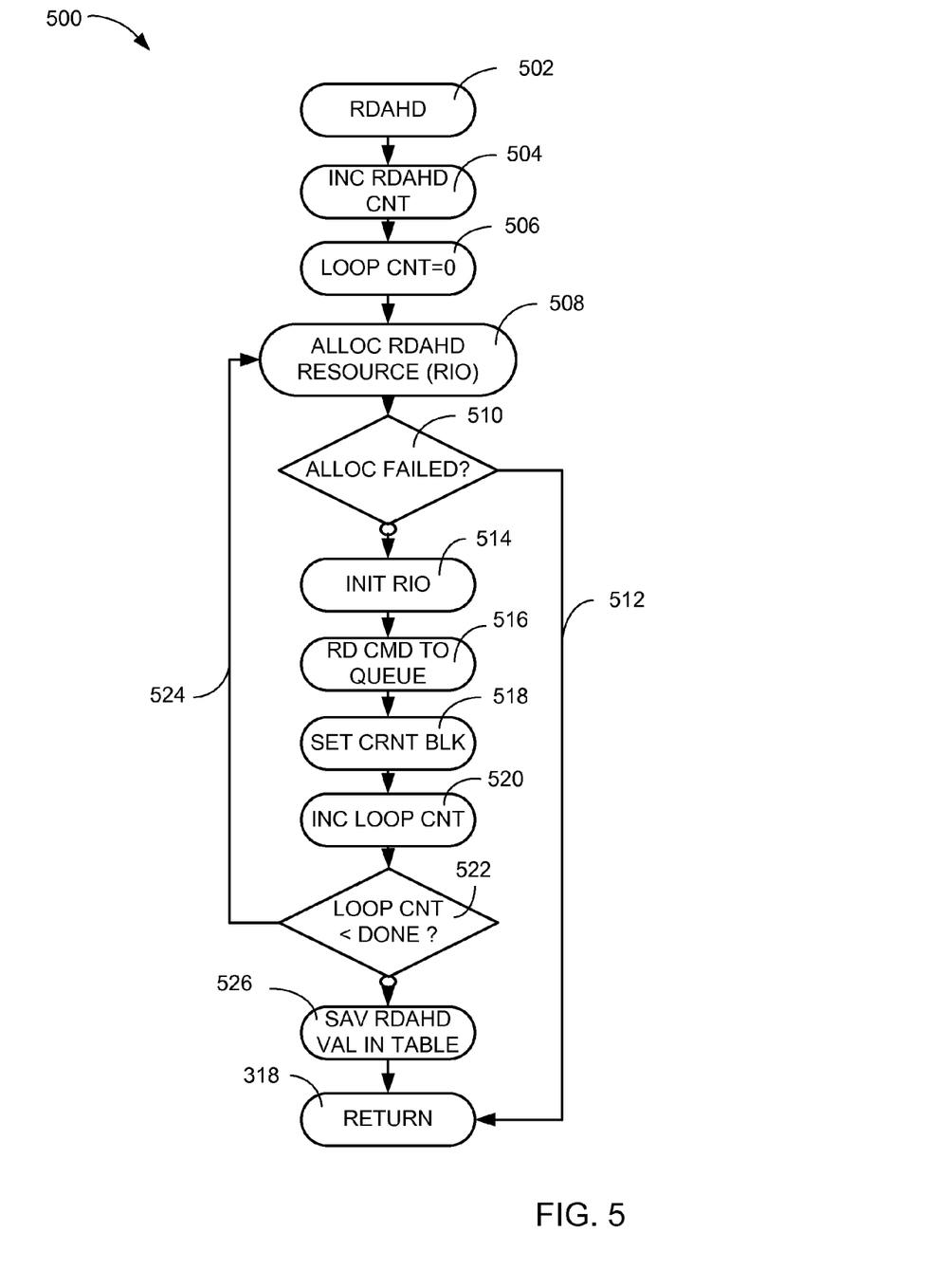
FIG. 5 is a functional flow diagram of a forced read ahead command execution.

Referring now to FIG. 5, therein is shown a functional flow diagram of a forced read ahead command 500 execution. The functional flow diagram of the forced read ahead command 500 depicts a forced read ahead entry 502 that progresses to an increment read ahead count 504. The increment read ahead count 504 updates a location in the memory space of the CPU 104, of FIG. 1. The flow then moves to a loop count equal zero 506.

The loop count equal zero 506 initializes the loop count for the forced read ahead command 500 execution. The loop count will monitor the number of forced reads ahead that are issued. The flow then moves to an allocate read ahead resources (RIO) 508.

The allocate read ahead resources (RIO) 508 verifies the required space is available in the cache 116, of FIG. 1, and the command queue, within the disk interface controller 108, of FIG. 1, can accept the additional command. The cache 116 must have sufficient space to accept 36 loops of 512 blocks for a high definition video stream or 64 loops of 128 blocks for a non-high definition video stream. The flow them moves to a check for allocation failed 510. If the allocation of resources did fail for any reason, the flow takes an exit on failure 512 and moves to the return 318 without further processing.

If the check for allocation failed 510 detects that no failure has occurred and all resources are accounted for, the flow moves to an initialize RIO 514 in order to activate the read ahead resources in the cache 116 and the disk interface controller 108. The flow then moves to a read command to queue 516, which performs the loading of pointers in the cache 116 and the disk interface controller 108 in order to execute the read ahead commands.

The flow then moves to a set current block 518, which establishes the next block to read from the hard disk drives 112, of FIG. 1. The command extent is set by the current block number plus the read ahead block number, 512 for the HD video stream and 128 for the non-HD video stream.

The flow then moves to an increment loop count 520, which keeps track of the number of loops the forced read ahead command has already executed. The flow moves to a loop count done 522 decision block to compare against the appropriate loop count, 36 for the HD video stream and 64 for the non-HD video stream. If the loop count has not reached the terminal count, the flow returns through a read next blocks 524 to the allocate read ahead resources (RIO) 508 to perform the next read ahead operation. If the loop count is found to be at the terminal count, the flow moves to a save read ahead value in the read ahead table 526.

The save read ahead value in table 526 adds the latest read ahead information to the table maintained in the memory space of the CPU 104. The table holds the latest 512 forced reads ahead done by the program of the present invention. The flow then moves to the return 318 allowing the CPU 104 to initiate other operations.

Figure 6:
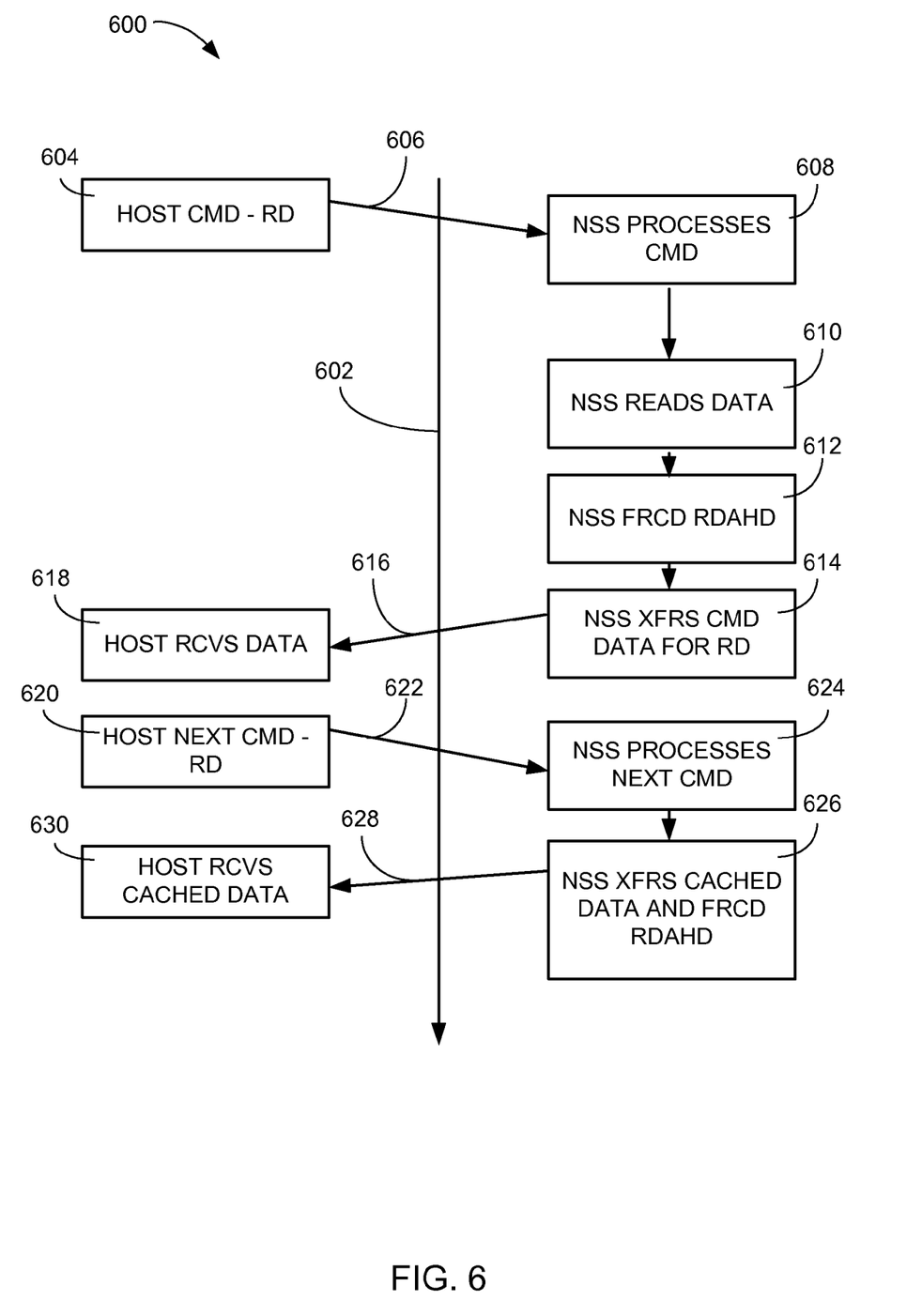
FIG. 6 is a block diagram of a command transfer sequence between a host and the network storage system.

Referring now to FIG. 6, therein is shown a block diagram of a command transfer sequence 600 between a host and the network storage system. The block diagram of the command transfer sequence 600 depicts a latency 602 having a linear latency in the downward direction. While the latency 602 does not represent an accurate time measure, it is indicative of the relative measure of the latency 602 between operations.

A host command read 604 may be generated by a host computer (not shown) for transferring a video stream to the system display and user interface 124, of FIG. 1. A command message 606 may be transferred to the network storage system (NSS) 100, of FIG. 1, for retrieval of the video stream data. A NSS processes CMD 608 requires the network storage system 100 to verify the command and retrieve the data form the hard disk drives 112, of FIG. 1.

When the logical block addresses (LBAs) of the requested video stream data has been processed, a NSS reads data 610 performs the actual task of reading the data from the hard disk drives 112 and moving the data to the cache 116, of FIG. 1, for transfer through the host interface controller 102, of FIG. 1, in a later operation. A NSS forced read ahead 612 may be performed while the data for the original command is being moved from the hard disk drives 112 to the cache 116.

The NSS forced read ahead 612 will determine how much data to retrieve based on several factors including whether the video stream is HD or not, how many commands are currently pending from the host interface controller 102, how many forced reads ahead have been performed and is the current time within a polling interval. Note that it is possible for several different hosts to generate commands delivered through the host interface controller 102. For simplicity of this discussion a transfer between the network storage system 100 and a single host is used as an example. It is understood that other commands may be executing concurrently with the example command flow.

The NSS forced read ahead 612 may move data from the hard disk drives 112 to the cache 116 in anticipation of a next command from the same host. The amount of data may change dynamically based on the conditions and activity level of the commands received from all hosts that are communicating with the network storage system 100 through the host interface controller 102.

A NSS XFR data for RD 614 may be entered when a part of the data to be transferred is held in the cache 116 and the disk interface controller 108 is actively moving the data. The latency 602 associated with the data transfer includes the command overhead, queue length in the disk interface controller 108, the access time of the hard disk drive 112 and rotational latency for reading the data.

A drive data to host 616 moves the data from the hard disk drives 112 between the host interface controller 102 and the system display and user interface 124. A host rcvs data 618 completes the command operation and allows the host to post the next data request as a next command read as shown in a host next command 620. A next command message 622 moves the host read command into the network storage system 100 to be received by a NSS processes next command 624.

Due to the forced read ahead associated with the first read command, the data required for the host next command 620 is already located in the cache 116. This removes all of the latency associated with the disk interface controller 108 and the hard disk drives 112. The cached data is immediately ready to transfer after the command processing overhead. A NSS XFR cached data and forced read ahead 626 moves the data from the cache 116 through the host interface controller 102 to the system display and user interface 124 through a transfer cached data 628. The host may receive the cached data by a host receives cached data 630.

It is understood that above exchange is an example only and additional transfers may be associated with a video stream transfer. Since Audio/Video (AV) files are unstructured and are stored in a file system, sequential AV data on the screen may not be stored sequentially on the media and may be scattered in the same neighborhood on the media. Location of such file fragments is quasi-deterministic and predicting the address to which the next I/O would come is a daunting task. By reading iterative groups of small blocks of data the disk interface bus 114 is better utilized and no additional latency is added to the host command processing.

Figure 7:
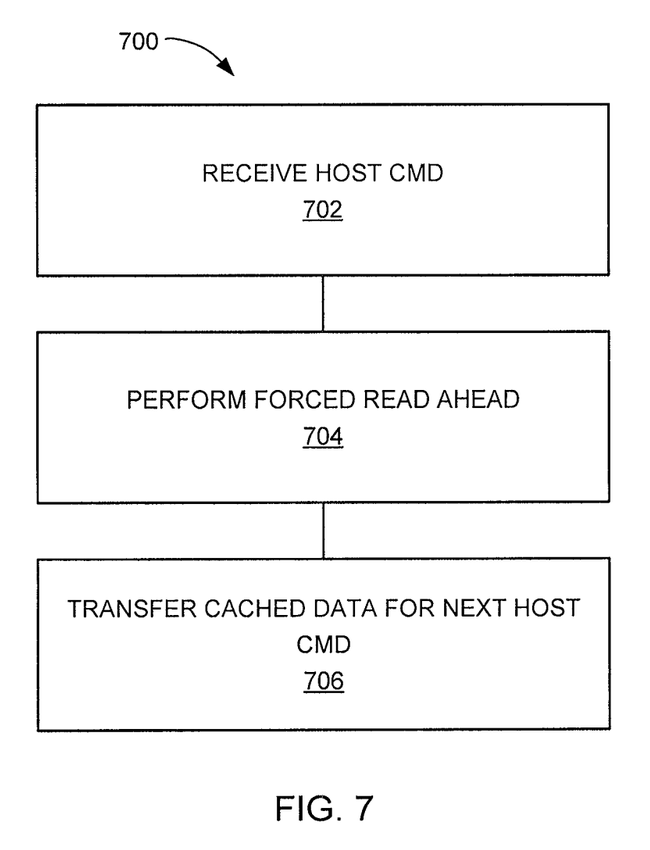
FIG. 7 is a flow chart of a method of operation of a network storage system in a further embodiment of the present invention.

Referring now to FIG. 7, therein is shown a flow chart of a method 700 of operation of the network storage system 100 in a further embodiment of the present invention. The method 700 includes: receiving a host command for displaying a video stream in a block 702; performing a forced read ahead of the video stream beyond the host command including: identifying a high definition video stream, dynamically setting a block count and a loop count for the forced read ahead, and transferring data from hard disk drives to a cache for anticipating a host next command in a block 704; and transferring cached data from the cache for responding to the host next command for displaying the video stream in a block 706.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a network storage system comprising:
    receiving a host command for displaying a video stream;
    performing a forced read ahead of the video stream beyond the host command including:
        identifying a high definition video stream,
        dynamically setting a block count and a loop count for the forced read ahead in which setting the block count is equal to 512 and the loop count is equal to 36, and transferring data from hard disk drives to a cache for anticipating a host next command; and
    transferring cached data from the cache for responding to the host next command for displaying the video stream.

2. The method as claimed in claim 1 wherein dynamically setting the block count and the loop count for the forced read ahead includes calculating a percentage of read ahead done.

3. The method as claimed in claim 1 wherein identifying the high definition video stream includes identifying a non-high definition video stream.

4. The method as claimed in claim 1 wherein performing the forced read ahead of the video stream including setting read ahead enabled in a logical drive and the hard disk drives and a forced read ahead firmware-controlled bit by a Central Processing Unit (CPU).

5. The method as claimed in claim 1 wherein identifying the high definition video stream including treating a non-high definition video stream as a high definition video stream when the percent of read ahead done is more than a threshold percent.

6. A method of operation of a network storage system comprising:
    receiving a host command for displaying a video stream including providing a system display and user interface for displaying the video stream;
    performing a forced read ahead of the video stream beyond the host command including:
        identifying a high definition video stream,
        dynamically setting a block count and a loop count for the forced read ahead in which setting the block count is equal to 512 and the loop count is equal to 36, and transferring data from hard disk drives to a cache for anticipating a host next command including activating a disk interface controller for queuing the forced read ahead; and
    transferring cached data from the cache for responding to the host next command for displaying the video stream including providing a network attachment between the system display and user interface and a host interface controller.

7. The method as claimed in claim 6 wherein dynamically setting the block count and the loop count for the forced read ahead includes calculating a percentage of read ahead done by dividing a total number of host read commands by a number of the forced read ahead done.

8. The method as claimed in claim 6 wherein identifying the high definition video stream includes identifying a non-high definition video stream including setting the block count to 128 and the loop count to 64.

9. The method as claimed in claim 6 wherein performing the forced read ahead of the video stream including setting read ahead enabled in the hard disk drives and a forced read ahead firmware-controlled bit by a Central Processing Unit (CPU) including setting a poll interval to substantially two seconds.

10. The method as claimed in claim 6 wherein identifying the high definition video stream including treating a non-high definition video stream as a high definition video stream when the percent of read ahead done is more than a threshold percent and treating a high definition video stream as a non-high definition video stream when the percent of read ahead done is greater than the range of 20 to 50%.

11. A network storage system comprising:
    a host interface controller for receiving a host command;
    a disk interface controller for performing a forced read ahead beyond the host command including:
    hard disk drives with a high definition video stream stored thereon, and
    a data and control bus between a cache and the disk interface controller for dynamically setting a block count equal to 512 and a loop count equal to 36 of the forced read ahead; and
    cached data transferred from the cache for responding to the host next command for displaying the high definition video stream.

12. The system as claimed in claim 11 further comprising a Central Processing Unit (CPU) coupled to the disk interface controller for dynamically changing the block count and the loop count.

13. The system as claimed in claim 11 further comprising a network attachment coupled to the host interface controller for transferring the high definition video stream data.

14. The system as claimed in claim 11 wherein the hard disk drives with the high definition video stream stored thereon include a read ahead enabled bit set.

15. The system as claimed in claim 11 further comprising a Central Processing Unit for calculating a percent of the read ahead done.

16. The system as claimed in claim 11 further comprising:
    a system display; and
    a user interface and the system display coupled to the host interface controller.

17. The system as claimed in claim 16 further comprising a Central Processing Unit (CPU) coupled to the disk interface controller for dynamically changing the block count and the loop count.

18. The system as claimed in claim 16 further comprising a network attachment between the system display and the user interface and the host interface controller.

19. The system as claimed in claim 16 further comprising a Central Processing Unit coupled to the host interface controller and the disk interface controller.

20. The system as claimed in claim 16 further comprising a peripheral component interconnect bus between the host interface controller and a Central Processing Unit.

* * * * *